No. 792,419.  Patented June 13, 1905.

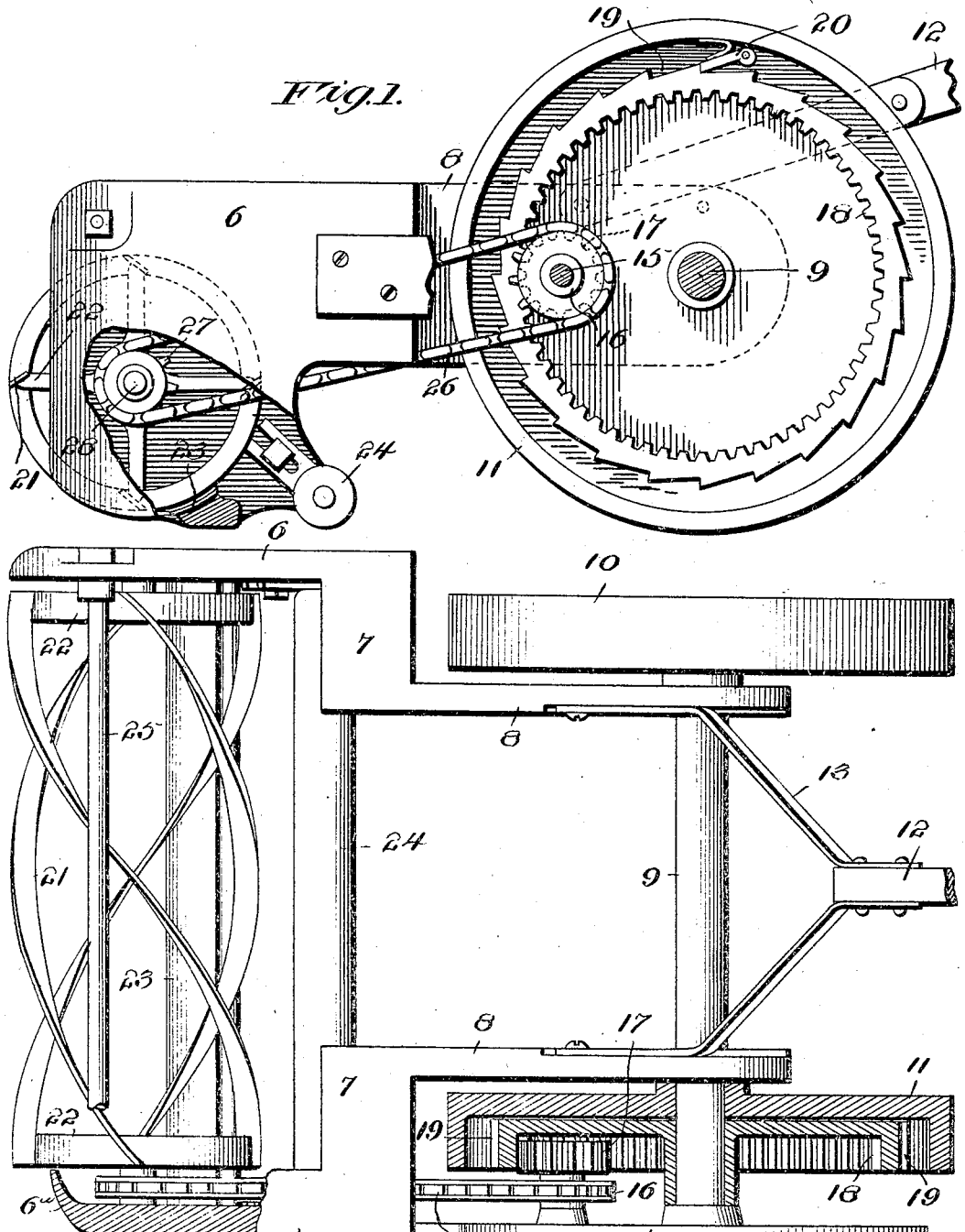

UNITED STATES PATENT OFFICE.

ANDREW JACKSON, OF WINNETKA, ILLINOIS.

LAWN-MOWER.

SPECIFICATION forming part of Letters Patent No. 792,419, dated June 13, 1905.

Application filed December 29, 1904. Serial No. 238,743.

*To all whom it may concern:*

Be it known that I, ANDREW JACKSON, a citizen of the United States, residing at Winnetka, in the county of Cook and State of Illinois, have invented new and useful Improvements in Lawn-Mowers, of which the following is a specification.

This invention is an improvement in lawn-mowers, and is characterized particularly by a novel drive mechanism whereby the rotating knives are driven from the ground-wheel and also by an improvement in the construction of the frame which allows the knives to extend across practically the whole width of the mower whereby it may successfully be used for trimming grass close to an object such a fence or a building.

In the accompanying drawings, Figure 1 is a side elevation of the machine with parts broken away and in section. Fig. 2 is a plan view thereof, partly in section.

Referring specifically to the drawings, 6 indicates the side frames of the machine. Toward the rear these are offset inwardly, as at 7, and have rearwardly-extending arms 8, in which the main axle 9 is journaled. This axle is carried by the ground-wheels 10 and 11, of which the latter is the driver. These wheels fit in behind the offsets 7, so that the extreme width of the machine is no greater than the distance between the outer faces of the side frames. Also, the ground-wheels run behind the cutter, so that the uncut grass is not bent down or lodged by the drive-wheels, and there is less liability of the driving-gear being clogged thereby. The machine also runs easier, particularly when cutting long grass. The handle 12 is pivoted by its bail 13 to the arms 8 between the ground-wheels.

14 indicates a shield which is supported on the side frame 6 and covers the gearing in the drive-wheel 11 to keep out grass and prevent clogging or accidents. This shield also serves to support a stub-shaft 15, on which a driving-sprocket 16 and pinion 17 are mounted. The sprocket and pinion are made in one piece or fastened together, the pinion being on the inner end of the stub-shaft toward the driving-wheel. The pinion meshes with the internal gear-wheel 18, which is loose on the axle 9 and is located within the rim of the drive-wheel 11. The wheel 18 has spur ratchet-teeth 19, which are engaged by a spring-pawl 20, carried within the rim of the drive-wheel 11. On forward movement the pawl engages the ratchet and drives the gearing, but slips on the backward movement.

The knives are indicated at 21, extending between spiders 22, which have spindles which find bearings in the side plates 6. The knives shear across a fixed cutter-bar 23, extending thereunder across between the side frames, and behind the cutter-bar is a ground-roller 24 to support the front of the machine. The side frames are properly spaced apart and supported by a rod 25, as well as by the parts heretofore referred to. The knives are driven by a chain 26, which extends around the sprocket-wheel 16 and around a sprocket 27 on one of the spindles 28, which carry the knives. On the driving side of the machine the side frame is dished or curved in at the front, as at 6ª, forming a guard which prevents grass getting into the chain.

Inasmuch as the drive-wheels follow in the swath, they take a better grip on the ground than if either of them ran in the uncut grass. This gives a better and easier drive. It also permits the machine to run as close to the side of a building or fence as the side plates will allow, and consequently much closer than if the driving-wheels were carried outside the swath.

Having thus described my invention, what is claimed as new, and desired to be secured by Letters Patent, is—

In a lawn-mower, the combination with a frame offset inwardly at the rear end, a rotary cutter therein, and a drive-wheel located outside said rear end and carrying a pawl, of a wheel loose on the axle of the drive-wheel and having a rim on the outside of which is a ratchet and on the inside of which is an internal gear, a shield supported on the frame and located outside said wheels and having a stub-shaft projecting inwardly, a pinion on the shaft and engaging the gear, and gearing between the pinion and the cutter.

In testimony whereof I have signed my name to this specification in the presence of two subscribing witnesses.

ANDREW JACKSON.

Witnesses:
CLARA PROSCHE,
H. G. BATCHELOR.